(12) United States Patent
Ahire et al.

(10) Patent No.: US 11,975,453 B2
(45) Date of Patent: May 7, 2024

(54) METHOD FOR SELECTIVE, AUTONOMOUS PROCESSING OF REGIONS OF A WORKPIECE VIA THREE-DIMENSIONAL SANDING

(71) Applicant: GrayMatter Robotics Inc., Gardena, CA (US)

(72) Inventors: Avadhoot L. Ahire, Gardena, CA (US); Cheng Gong, Gardena, CA (US); Rishav Guha, Gardena, CA (US); Satyandra K. Gupta, Los Angeles, CA (US); Ariyan M Kabir, Los Angeles, CA (US); Sagarkumar J. Panchal, Los Angeles, CA (US); Brual C. Shah, San Pedro, CA (US)

(73) Assignee: GrayMatter Robotics Inc., Gardena, CA (US)

( * ) Notice: Subject to any disclaimer, the term of this patent is extended or adjusted under 35 U.S.C. 154(b) by 0 days.

(21) Appl. No.: 18/523,712

(22) Filed: Nov. 29, 2023

(65) Prior Publication Data
US 2024/0091935 A1   Mar. 21, 2024

Related U.S. Application Data

(63) Continuation-in-part of application No. 18/389,166, filed on Nov. 13, 2023, which is a
(Continued)

(51) Int. Cl.
*B24B 51/00* (2006.01)
*B25J 9/16* (2006.01)
(Continued)

(52) U.S. Cl.
CPC ............ *B25J 9/1653* (2013.01); *B24B 51/00* (2013.01); *B25J 9/163* (2013.01); *B25J 9/1664* (2013.01);
(Continued)

(58) Field of Classification Search
CPC ........ B25J 9/1653; B25J 9/163; B25J 9/1664; B25J 9/1679; B25J 9/1697; B25J 11/0065;
(Continued)

(56) References Cited

U.S. PATENT DOCUMENTS 10,718,119 B2 *   7/2020   Telleria .............. B05C 11/1039
11,590,661 B2 *   2/2023   Wierzbicki ............ B24B 57/02
(Continued)

*Primary Examiner* — Robert T Nguyen
(74) *Attorney, Agent, or Firm* — Run8 Patent Group, LLC; Peter Miller

(57) ABSTRACT

A method includes: accessing a virtual model defining a geometry of a workpiece; navigating an optical sensor about the workpiece; accessing an image of the workpiece; detecting a marker, on the workpiece, depicted in the image; defining a first workpiece region of the workpiece bounded by the marker; defining a toolpath within the first workpiece region based on a geometry of the first workpiece region represented in the virtual model; assigning a first target force to the first toolpath; and during a processing cycle accessing a first sequence of force values output by a force sensor coupled to the sanding head, navigating the sanding head across the first workpiece region according to the first toolpath, and based on the first sequence of force values, deviating the sanding head from the first toolpath to maintain forces of the sanding head on the workpiece proximal the first target force.

20 Claims, 4 Drawing Sheets

Related U.S. Application Data continuation-in-part of application No. 18/232,275, filed on Aug. 9, 2023, now Pat. No. 11,883,961, which is a continuation-in-part of application No. 18/142,480, filed on May 2, 2023, and a continuation-in-part of application No. 18/136,244, filed on Apr. 18, 2023, now Pat. No. 11,820,018, and a continuation-in-part of application No. 18/111,470, filed on Feb. 17, 2023, which is a continuation-in-part of application No. 17/829,193, filed on May 31, 2022, now Pat. No. 11,613,014, said application No. 18/136,244 is a continuation-in-part of application No. 17/829,193, filed on May 31, 2022, now Pat. No. 11,613,014, said application No. 18/142,480 is a continuation-in-part of application No. 17/829,193, filed on May 31, 2022, now Pat. No. 11,613,014, which is a continuation of application No. 17/826,840, filed on May 27, 2022.

(51) Int. Cl.
| | | |
|---|---|---|
| *B25J 11/00* | (2006.01) | |
| *B25J 13/08* | (2006.01) | |
| *G06T 1/00* | (2006.01) | |
| *G06T 7/13* | (2017.01) | |
| *G06T 7/60* | (2017.01) | |
| *G06T 19/00* | (2011.01) | |

(52) U.S. Cl.
CPC .......... *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search
CPC ...... B25J 13/085; B24B 51/00; G06T 1/0014; G06T 7/13; G06T 7/60; G06T 19/00; G06T 2207/10024; G06T 2219/004
See application file for complete search history.

(56) References Cited

U.S. PATENT DOCUMENTS

| | | | |
|---|---|---|---|
| 2020/0171620 A1* | 6/2020 | Aubin | B24B 49/12 |
| 2021/0260720 A1* | 8/2021 | Chankaramangalam | B24B 49/12 |
| 2023/0001448 A1* | 1/2023 | Hemes | B05D 3/12 |

* cited by examiner

METHOD FOR SELECTIVE, AUTONOMOUS PROCESSING OF REGIONS OF A WORKPIECE VIA THREE-DIMENSIONAL SANDING

CROSS-REFERENCE TO RELATED APPLICATIONS

This Application is a continuation-in-part of U.S. application Ser. No. 18/389,166, filed on 13 Nov. 2023, which is a continuation-in-part of U.S. application Ser. No. 18/232,275, filed on 9 Aug. 2023, which is a continuation-in-part of U.S. application Ser. No. 18/111,470, filed on 17 Feb. 2023, Ser. No. 18/136,244, filed on 18 Apr. 2023, and Ser. No. 18/142,480, filed on 2 May 2023, each of which is a continuation-in-part of U.S. application Ser. No. 17/829,193, filed on 31 May 2022, which is a continuation of U.S. application Ser. No. 17/826,840, filed on 27 May 2022, each of which is incorporated in its entirety by this reference.

This Application is related to U.S. application Ser. No. 18/126,941, 27 Mar. 2023, which is incorporated in its entirety by this reference.

TECHNICAL FIELD

This invention relates generally to the field of automated finishing and more specifically to a new and useful system and method for autonomously scanning, modeling; and processing a select region of a workpiece in the field of automated finishing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
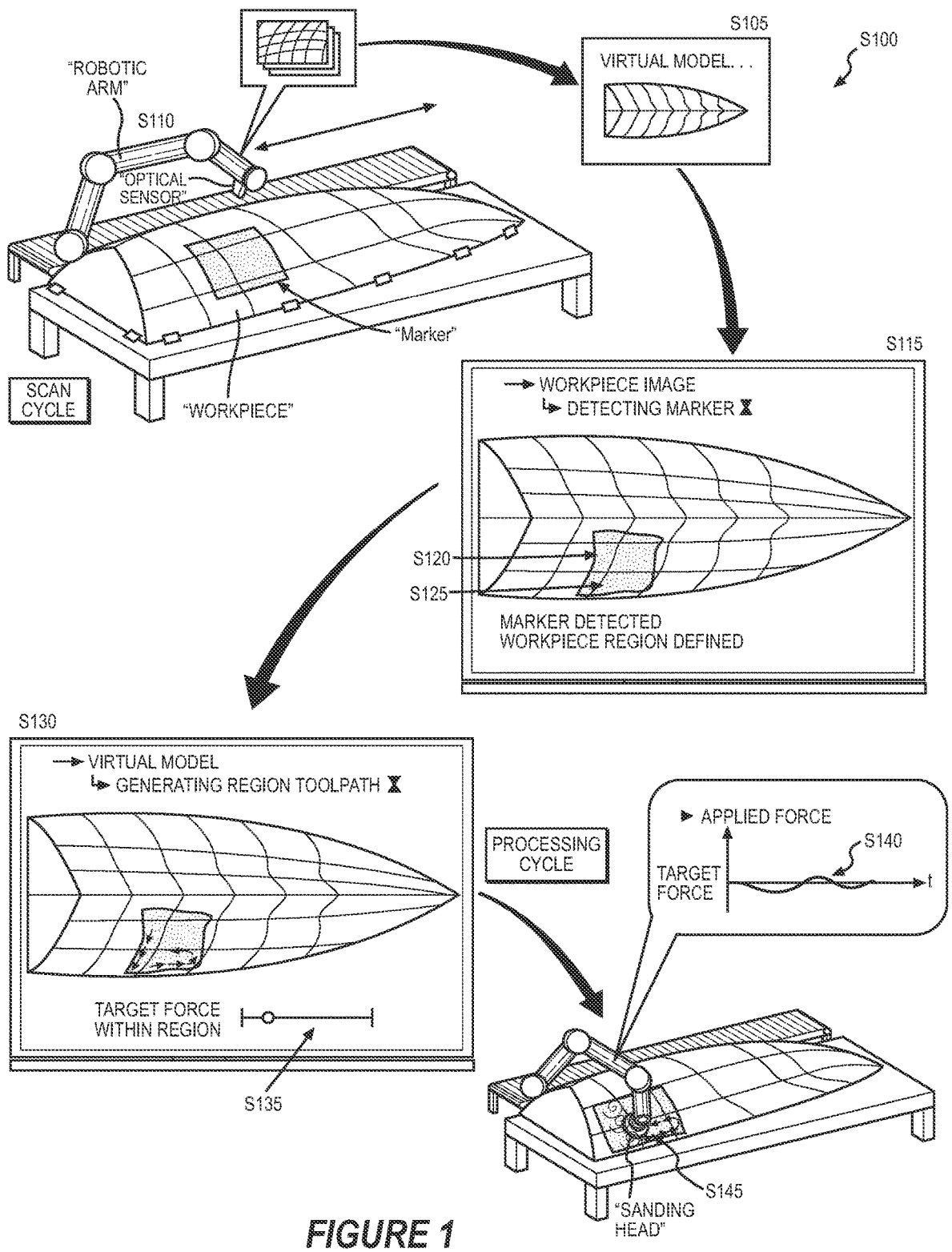
FIG. 1 is a flowchart representation of a method.
Figure 2:
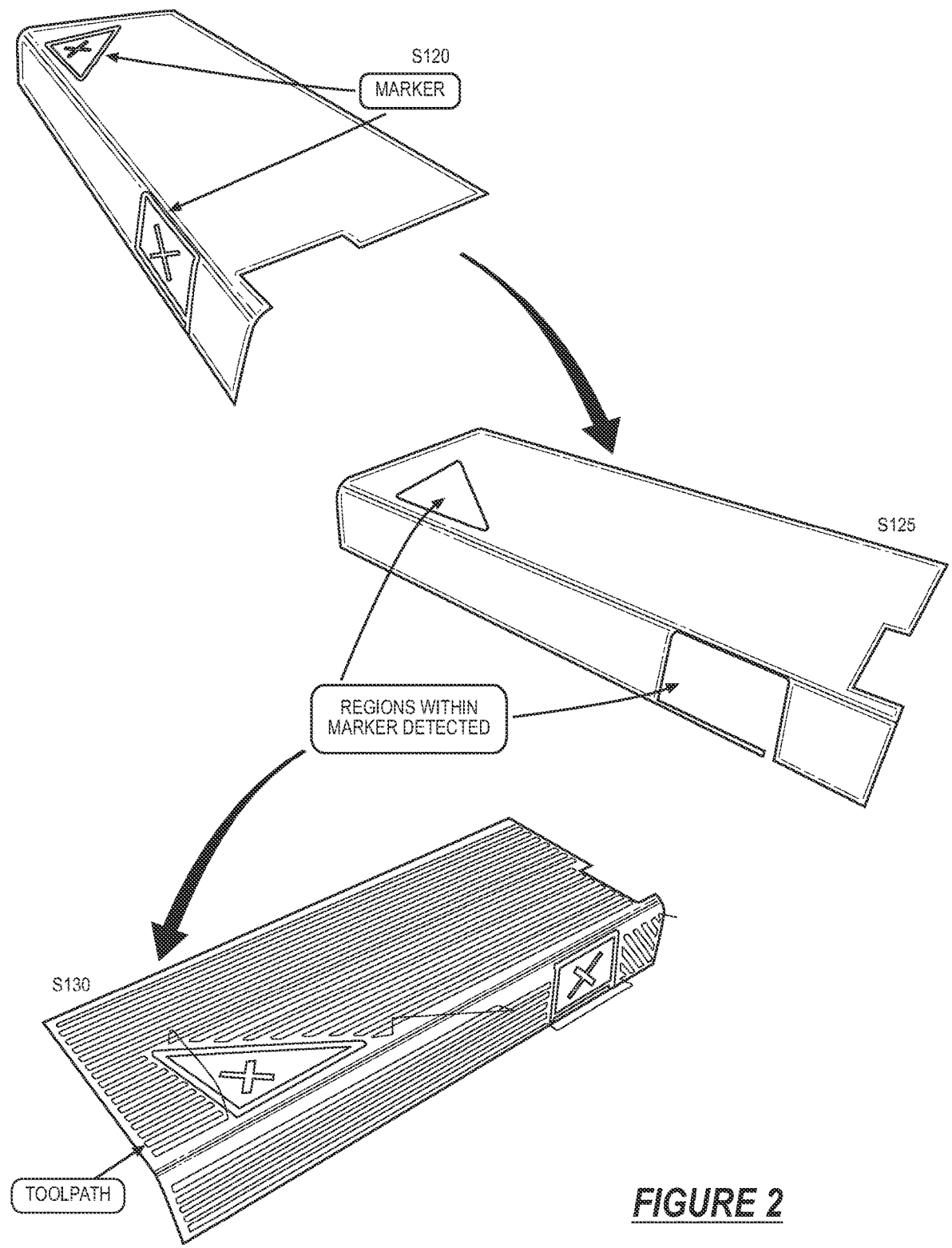
FIG. 2 is a flowchart representation of one variation of the method.

As shown in FIGS. 1 and 2, a method S100 for autonomously processing a workpiece includes: accessing a virtual model defining a geometry of a workpiece in Block S105; by a set of actuators, navigating an optical sensor about the workpiece in Block S110; accessing an image of the workpiece in Block S115; detecting a marker, on the workpiece, depicted in the image in Block S120; defining a first workpiece region of the workpiece bounded by the marker in Block S125; defining a toolpath within the first workpiece region based on a geometry of the first workpiece region represented in the virtual model in Block S130; and assigning a first target force to the first toolpath in Block S135.

The method S100 further includes, during a processing cycle: accessing a first sequence of force values output by a force sensor coupled to the sanding head in Block S140; and, via the set of actuators, navigating the sanding head across the first workpiece region according to the first toolpath and, based on the first sequence of force values, deviating the sanding head from the first toolpath to maintain forces of the sanding head on the workpiece proximal the first target force in Block S145.

1.1 Variation

In one variation, the method S100 includes: accessing an image of the workpiece in Block S115; detecting a marker, on the workpiece, depicted in the image in Block S120; defining a first workpiece region of the workpiece bounded by the marker in Block S125; defining a toolpath within the first workpiece region based on a geometry of the first workpiece region in Block S130; and assigning a first target force to the first toolpath in Block S135.

This variation of the method S100 further includes, during a processing cycle: accessing a first sequence of force values output by a force sensor coupled to the sanding head in Block S140; and, via a set of actuators, navigating the sanding head across the first workpiece region according to the first toolpath and deviating the sanding head from the first toolpath to maintain forces of the sanding head on the workpiece proximal the first target force in Block S145 based on the first sequence of force values.

2. Applications

Generally, as shown in FIGS. 1, 2, 3A, 3B, and 4, the autonomous scanning and processing system (hereinafter the "system") can execute Blocks of the method S100: to capture optical data (e.g., images, depth data) of a workpiece; to detect a marker, located on the workpiece, represented in the optical data; to identify a region of the workpiece for processing (e.g., sanding, buffing, polishing) based on the marker; to generate a toolpath for processing the region of the workpiece; and to autonomously execute a processing cycle within the region of the workpiece according to the toolpath.

More specifically, the system is configured to autonomously execute Blocks of the method S100: to access a two-dimensional image of the workpiece; to identify a region of the workpiece (e.g., the region of the workpiece bounded by a marker) for processing based on features detected in the two-dimensional image of the workpiece; to navigate an optical sensor (e.g., a laser line scanner) about the region of the workpiece to capture scan data of the region; to assemble the scan data into a virtual model representing a geometry of the region; to detect the marker and/or an edge of the workpiece in the virtual model; and to generate a toolpath spanning the region—bounded by the marker and/or the edge—of the workpiece. For example, the system can execute Blocks of the method S100 to: rapidly capture lower-resolution color images depicting the workpiece via a color camera; identify markers arranged on the workpiece in these color images; isolate a particular region of the workpiece for higher-resolution scanning via a higher-resolution optical sensor (e.g., a laser line scanner); and selectively scan this region of the workpiece with the higher-resolution optical sensor. The system can then: assemble a high-resolution representation of the workpiece from these higher-resolution scan data; accurately detect (or "locate") an edge of the marker in the virtual model; and refine a boundary of this region of the workpiece for autonomous processing (e.g., sanding, polishing, grinding) by the system. Therefore, the system can selectively scan and process a region of the workpiece containing or bounded by a visual marker in order to: decrease scan time of the workpiece, reduce computational complexity, reduce latency from scanning to workpiece processing, and reduce human input or guidance to process the workpiece by isolating scan time.

In one implementation, the system executes Blocks of the method S100 to selectively scan and process a region of a workpiece containing a defect denoted by tape (e.g., a "marker") temporarily applied to the workpiece. In one example, an operator locates multiple (e.g., four) lengths of tape around a region of a workpiece recently re-coated (or "re-sprayed") with a paint or primer following repair of a defect (e.g., a crack, a scratch, a dent) in this region. In another example, the operator locates multiple lengths of tape around a region of the workpiece exhibiting excess orange peel or paint runs. Accordingly, in these examples, the system: navigates a color camera over the workpiece; captures a series of two-dimensional images of the workpiece via the color camera; detects each length of tape in these series of two-dimensional images; defines a target region of the workpiece contained within (i.e., bounded by), including, and extending past these lengths of tape; navigates a second, higher-resolution the optical sensor (e.g., a laser line scanner) about the target region of the workpiece; captures higher-resolution scan data representing the target region via the higher-resolution the optical sensor; assembles these scan data into a virtual model representing this region the workpiece (or a "partial virtual model"); detects these lengths of tape in the virtual model (e.g., based on absence of laser line data or "holes" in the virtual model); and refines a boundary encompassing the target region of the workpiece within the virtual model based on locations of these lengths of tape.

The system can then: generate a toolpath executable by the system to process (e.g., sand, grind, polish) the target region of the workpiece up to (e.g., within one millimeter of) the edges of these lengths of tape, thus defining the target region; and process the region of the workpiece according to the toolpath in order to autonomously process (e.g., repair) the target region of the workpiece. Therefore, in these examples, rather than scanning the entire workpiece via the higher-resolution optical sensor, the system can execute Blocks of the method S100: to roughly (or "coarsely") identify the target region on the workpiece based on tape markers detected in lower-resolution two-dimensional color images of the workpiece; to selectively scan only this target region of the workpiece with the high-resolution optical sensor; and to derive an accurate three-dimensional geometry and boundary of the target region of the workpiece based on high-resolution three-dimensional optical data selectively captured within the roughly-defined target region of the workpiece, thereby decreasing total scanning and processing durations to repair the workpiece.

2.1 Target Region Boundary

Further, the system can detect and/or define a boundary of the region of the workpiece denoted by the marker. For example, the system can: detect an absence of data within the virtual model; detect the absence of data as a marker by matching the geometry of the absence of data to a known marker geometry (e.g., a width of 0.25", 1", or 1.5" etc.); detect a contiguous boundary of the marker completely bounding a region of the workpiece; and define the target region of the workpiece as the region of the workpiece completely bounded by the marker.

The system can additionally detect the boundary of the target region based on the workpiece edge. For example, the system can: detect a first absence of data within the virtual model; detect the first absence of data as a marker by matching the geometry of the absence of data to a known marker geometry width (e.g., 0.25", 1", or 1.5"); detect a non-contiguous boundary of the marker partially bounding a region of the workpiece; detect a second absence of data within the virtual model; define the second absence of data as a workpiece edge by detecting a geometry of the second absence of data defining a width greater than the known marker geometry width; and define the workpiece edge as the boundary of the region to complete the non-contiguous boundary of the region corresponding to the marker.

Therefore, the system can detect and/or define a boundary of the target region of the workpiece for a marker that fully or partially bounds the target region.

2.2 Keep-Out Zones

In one implementation, the system can detect a "keep-out zone" indicating a region of the workpiece to avoid processing (e.g., buffing, polishing, sanding) based on the geometry of the marker. The system can: access a set of "keep-out zone" marker geometries; access a virtual model of a workpiece including a marker; detect a hole (e.g., an absence of data) in the virtual model; define a geometry of the hole; and, in response to the geometry of the hole approximating a geometry of the set of "keep-out zone" geometries, generate a toolpath rule to actuate the end effector at least a threshold distance away (e.g., 1 mm, 5 mm, 1 cm) from a keep-out region defined by the marker.

Further, the system can execute the process described above to detect a "keep-out zone" indicating a region of the workpiece to avoid scanning. For example, the system can: access a set of "keep-out zone" marker geometries; access a virtual model of a workpiece including a marker; detect a hole (e.g., an absence of data) in the virtual model; define a geometry of the hole; and, in response to the geometry of the hole approximating a geometry of the set of "keep-out zone" geometries, identify the hole as a maker.

In one implementation, a single linear mark approximating a forward-slash or back-slash (/ or \) lacking a contiguous or complete boundary around the marker can indicate a region of the workpiece to avoid scanning and/or processing. In another implementation, two intersecting lengths of tape (e.g., approximating an "X") lacking a contiguous or complete boundary around the marker can indicate a region of the workpiece to avoid scanning and/or processing.

2.3 Toolpath Characteristics

Further, the system can define segments of the toolpath based on a proximity to the boundary. For example, the system can segment the toolpath into a first segment beyond a threshold distance from the boundary (e.g., distal the boundary of the marker by one to six inches) and a second segment within the threshold distance of the boundary of the marker. The system can define the first segment of the toolpath to include: a first actuation velocity of the sanding head; a first target force between the sanding head and the workpiece; and a first sanding head orientation normal to the surface of the workpiece. The system can define the second segment of the toolpath to include a second actuation velocity less than the first actuation velocity; a second target force less than the first target force; and a second sanding head orientation non-normal to the surface of the workpiece. Therefore, based on the proximity of the sanding head to a boundary of the region (e.g., the boundary of the marker), the system changes the toolpath to increase an accuracy of processing about the boundary.

Then, the system can execute a processing cycle of the workpiece according to the defined toolpath segments. For example, the system can actuate a sanding head along a segment of the toolpath to sand the target region of the workpiece defined by the marker. The system can alternatively or additionally execute a processing cycle to buff, polish, or grind the target region of the workpiece.

3. System

In one implementation, shown in FIG. 1, the system includes: a robotic arm arranged in or adjacent a work zone and including a set of articulatable joints interposed between a series of arm segments; an end effector supported on a distal end of the robotic arm; an optical sensor (e.g., a laser scanner) arranged on or integrated into the end effector and configured to capture optical images (e.g., depth maps, photographic color images) of a workpiece; a position sensor configured to output signals representing (or assemblable into) a three-dimensional position of the optical sensor; a display configured to render a user interface accessible by an operator; and/or a controller configured to execute Blocks of the method S100.

In this implementation, the system can also include a gantry or mobile platform configured to traverse the robotic arm longitudinally along the work zone, such as to reach and process an elongated part defining a high length-to-width ratio (e.g., a high aspect ratio), such as a boat hull or aircraft wing.

In one implementation, the optical sensor defines a laser line scanning sensor configured to: project a laser (e.g., a spot, line, array of points) onto the workpiece; capture scan data of the laser projection on the surface of the workpiece; and derive a surface contour of the workpiece based on distortions of the laser projection on the surface of the workpiece.

The system includes a position sensor configured to detect a position of the optical sensor. For example, the system: includes a one-, two-, or three-dimensional LIDAR sensor, a time-of-flight distance sensor, a stereoscopic camera, a depth sensor, and/or color camera arranged facing the robotic arm to detect a position of the optical sensor. The system can access one-dimensional distances or two- or three-dimensional images output by these sensors; and can derive and track three-dimensional positions of the optical sensor along the track.

In another implementation, the gantry or mobile platform and the joints of the robotic arm can include positional encoders (e.g., magnetic encoders) configured to output a signal corresponding to a position of the robotic arm on the conveyor or the angular position of the joint of the robotic arm. The system can compile the set of encoder signals to derive a position of the end effector and therefore the optical sensor. However, the system can implement any other method or technique to track three-dimensional positions of the robotic arm, optical sensor, and/or a reference point during a scanning or processing cycle.

In one implementation, the system can locate and articulate an end effector (e.g., a sanding head) according to the method described in U.S. patent application Ser. No. 18/232,275, filed on 9 Aug. 2023.

The controller: triggers the actuators of the system to traverse the optical sensor proximal the workpiece; and triggers the optical sensor to capture scan data to complete a scan. A scan can define a single "pass" of the optical sensor about a scan path, while scan data includes the scan data captured by the optical sensor along that scan path according to a set of scan parameters. A scan cycle defines a set of scans and a set of corresponding scan data captured during the set of scans. The system can compile the scan data into a virtual model of the workpiece defining a target resolution (e.g., exhibiting an error and hole size within a threshold error or hole size).

For example, the system can execute a baseline scan cycle to generate a baseline model defining a maximal resolution. The baseline scan cycle includes dozens or hundreds of scans characterized by dozens or hundreds of permutations of scan paths and sets of scan parameters. The system can then: compile the scan data from the set of scans included in the baseline scan cycle; and assemble a baseline virtual model of the workpiece defining the maximal resolution. The system can also execute a scan cycle to generate a virtual model defining a resolution less than the maximal resolution of the baseline virtual model. For example, the system can execute a scan protocol to capture a set of data to generate a virtual model representing the workpiece defining a minimal resolution.

4. Optical Sensors

Generally, the system can include a set of optical sensors configured to capture two-dimensional and/or three-dimensional scan data representing the workpiece.

4.1 Low-Resolution Optical Sensor

In one implementation, the system includes a low-resolution optical sensor, such as a two-dimensional color camera configured to capture two-dimensional color images of the workpiece. In this implementation, the system: navigates the camera, via the robotic arm, to an image location wherein the workpiece is within the field of view of the camera; and triggers the camera to capture an image of the workpiece. Based on the image of the workpiece, the system detects markers on the workpiece.

4.2 High-Resolution Optical Sensor

The system can include a high-resolution optical sensor, such as a laser line scanner configured to: emit light (e.g., a laser) toward the workpiece; and capture light (e.g., emitted light reflected back to the optical sensor) via a light receptor. Based on an elapsed time between emission and capture of the light (e.g., a time of flight), the system can derive a distance between the optical sensor and the workpiece. Therefore, by emitting and capturing light while traversing the optical sensor across a surface of the workpiece during a scan, the system can derive a surface contour of the workpiece.

5. Marker

In one implementation, the marker includes a material different from the material of the workpiece attached or adhered to the workpiece. For example, the marker can include tape applied to the surface by an operator of the system in an arrangement configured to bound a region of the workpiece for selective processing. In another example, the marker can include an ink stamped or drawn onto the workpiece wherein the ink exhibits a different reflectivity than the workpiece.

In one implementation, the workpiece is characterized by a first reflectivity and the marker is characterized by a second reflectivity different from the first reflectivity. In this implementation, the marker will reflect a different proportion of the light emitted by the optical sensor to the optical sensor than the workpiece. For example, for a mirror-finished workpiece and a matte marker, the workpiece may reflect 90% of the light emitted by the optical sensor to the optical sensor for capture while the marker may reflect 5% of the light emitted by the optical sensor to the optical sensor. The optical sensor thereby captures less light from the marked region of the workpiece (e.g., the region covered by tape) than from the non-marked region of the workpiece. Therefore, a virtual model generated from the scan data of the optical sensor for this workpiece will include a low density or absence of data proximal the marked region.

In one implementation, the marker can include light projected onto the surface of the workpiece. During scanning of the workpiece, the optical sensor will collect scan data including areas of high light intensity corresponding to marked regions of the workpiece. Therefore, the system can detect the marker on the workpiece corresponding to the high light intensity regions of scan data.

6. Coarse Resolution Workpiece Scan

Generally, the system can execute Blocks of the method S100 to: scan a workpiece; and detect a workpiece region denoted by a marker on the workpiece.

The method S100 includes coarsely scanning the workpiece by: navigating an end effector over the workpiece; accessing a set of images captured by a low-resolution optical sensor arranged on the end effector while traversing the workpiece; and compiling the set of images into a virtual model representing unloaded surfaces of the workpiece. Generally, the system can implement methods and techniques described in U.S. patent application Ser. No. 18/111,470 to: autonomously navigate a low-resolution optical sensor (e.g., a color camera) over the workpiece; capture optical images (e.g., photographic color images) of the workpiece; and assemble these optical images into a coarse virtual three-dimensional model that represents surfaces of the workpiece within a wide dimensional tolerance.

For example, after the operator loads the workpiece into the work zone and confirms processing limits for the workpiece, the system can initiate a scan cycle. During the scan cycle, the system can: navigate the optical sensor—located on the end effector—along the scan path over and offset above the workpiece; monitor a distance between the end effector and the workpiece based on scan data collected by the optical sensor; and implement closed-loop controls to maintain a target offset distance between the optical sensor and the workpiece (e.g., 20", 50 centimeters). In this example, for a workpiece defining an elongated geometry including a long axis located approximately parallel a longitudinal axis of the work zone, the system can actuate a conveyor supporting the robotic arm to traverse the robotic arm along the longitudinal axis of the work zone while traversing the end effector and the optical sensor laterally across the work zone to capture a sequence of optical images representing all surfaces of the workpiece accessible by a sanding head on the end effector.

The system can thus capture coarse scan data—such as color photographic images—from a set of optical sensors arranged on the end effector while traversing the end effector across (e.g., over, and not in contact with) the workpiece.

The system can then compile these images into a coarse (e.g., low-resolution, low data density) virtual three-dimensional model of the workpiece as described in U.S. patent application Ser. No. 18/111,470.

However, the system can implement any other methods or techniques to navigate the end effector and optical sensor over the workpiece, to collect optical images of the workpiece, and to generate a virtual three-dimensional model of the workpiece based on these optical images.

The system can therefore execute Blocks of the method S100 to: autonomously capture images of a workpiece occupying a work zone during a contactless coarse scan of the workpiece; and compile these scan data into a coarse virtual three-dimensional model.

6.1 Marker Detection: Template Matching

In one implementation, the system detects the marker within an image or coarse virtual model of the workpiece via template matching. For example, the system can: detect an absence of data within the virtual model; derive a geometry of the absence of data within the virtual model; access a set of marker templates; and match the geometry of the absence of data to a marker template of the set of marker templates. Therefore, the system can detect the marker based on a database of marker templates. Further, in response to detecting the marker, the system defines the toolpath based on the marker template (e.g., generates a toolpath instruction according to the dimensions of the marker template).

In this implementation, the system can generate marker templates such as by: executing a scan cycle of a set of markers on a workpiece; assembling the images from the coarse scan into a coarse virtual model including the set of markers; characterize the geometry of each marker; and store a representation of the geometry of the marker within a template database.

In one implementation, the system can detect the marker within an image or virtual model of the workpiece based on parameters of the marker. For example, the system can: detect an absence of data within the virtual model; derive a length parameter of the absence of data within the virtual model and a width parameter of the absence of data within the virtual model; access a set of parameter dimensions; identify a first parameter dimension of the set of parameter dimensions approximating the length parameter; and identify a second parameter dimension of the set of parameter dimensions approximating the width parameter. Therefore, similar to the process of template matching, the system detects the feature in the image or virtual model as a marker based on matching parameters (e.g., dimensions, colors, textures, patterns) of the marker within the image or virtual model to a set of stored parameters. In response to the marker matching one or more stored marker parameters, the system defines the toolpath based on the stored marker parameters (e.g., defines a length of the toolpath corresponding to the stored length parameters).

In one implementation, the system can detect a marker in an image or coarse virtual model of the workpiece based on a color of the marker. In this implementation, the system can: access a target color of the marker (e.g., a target color selected by an operator matching the color of the marker); access the image of the workpiece; detect a set of pixels within the image characterized by the target color; and, in response to the set of pixels defining a target geometry (e.g., a target width, a target variance indicating parallel edges, etc.) identify the set of pixels within the image as a marker.

However, the system can execute any other method for detecting the marker on the workpiece based on a coarse virtual model or image of the workpiece.

7. Fine Resolution Workpiece Scan

In one implementation, the system can additionally or alternatively execute a fine scanning cycle (e.g., high-resolution scan) of the whole workpiece or a region of the workpiece to derive a high-accuracy location of the boundary of the target region (e.g., the marker)

Generally, the system can execute Blocks of the method S100 to detect a workpiece region and selectively process (e.g., sand, buff, polish) the workpiece region. In particular, the system executes the method S100 by: accessing a virtual model defining a geometry of a workpiece; by a set of actuators, navigating an optical sensor about the workpiece; accessing an image of the workpiece; detecting a marker, on the workpiece, depicted in the image; defining a first workpiece region of the workpiece bounded by the marker; defining a toolpath within the first workpiece region based on a geometry of the first workpiece region represented in the virtual model; assigning a first target force to the first toolpath; and executing a processing cycle on the workpiece according to the toolpath and the first target force.

The system executes the method S100 to selectively process a target region of the workpiece. In one example, the system selectively sands a region of the workpiece exhibiting a defect (e.g., a scratch, an uneven surface finish) to remove the defect and blend the region with a remaining area of the workpiece beyond the target region. In another example, the system selectively buffs a target region of the workpiece including a different color paint than another region of the workpiece to prevent smudging of the paint into other regions of the workpiece. Therefore, the system can: detect a region for selective processing; and execute a processing cycle of the region to achieve a target surface finish of the region.

7.1 Marker Detection

As described above, in one implementation, the system traverses the high-resolution optical sensor (e.g., a laser line scanner) across the workpiece or a region of the workpiece to capture high-accuracy depth data defining a surface contour of the workpiece or the region of the workpiece.

In one implementation, the high-resolution optical sensor captures low-density data or no data for regions of the workpiece covered by the marker. In this implementation, when the scan data from the optical sensor is assembled into a virtual model, the system detects the marker as a "hole" (e.g., absence of data) in the model. The system can: assemble a high-resolution virtual model from the scan data exhibiting a low data density region or hole corresponding to the marker; execute an edge detection algorithm about the low data density region to interpolate a first edge of the marker and a second edge of the marker opposite and parallel the first edge; and, in response to the edge detection algorithm identifying two parallel edges (e.g., exhibiting a variance of +/−0.5 mm per 200 mm) offset by a threshold distance (e.g., a stored marker width, 15 mm, 1 inch) the system identifies the hole as a marker.

In response to identifying the hole in the virtual model as a marker, the system can generate a toolpath rule indicating that an actuator of the system not actuate a sanding head of the system past a boundary of the marker. However, if the system detects parallel edges offset by a distance greater than the threshold distance or non-parallel edges, the system identifies the hole as an error and triggers the set of actuators to traverse the optical sensor over the workpiece again to capture new scan data. Therefore, the system is configured to detect markers and distinguish markers from other edges and/or holes of the workpiece and the virtual model.

In one implementation, the system can execute a template matching algorithm, as described above, to detect the marker by matching a geometry of the marker to a known marker geometry of a set of known marker geometries.

7.2 Hole Detection

In one implementation, the system evaluates a series of scan data by assembling the scan data into a virtual model and detecting areas exhibiting an absence of data (e.g., a hole).

In one implementation, the system: detects an area of low-density data or an area exhibiting an absence of data within the virtual model; characterizes the geometry of the area; in response to the geometry of the area defining a width greater than a maximum width (e.g., above all known marker widths by more than 25%) generates a new set of scan parameters for the optical sensor to capture additional scan data of the area of the workpiece including the hole. The system can iteratively identify a geometry of holes within a virtual model and generate new scans until the geometry of the holes define a width approximating a known width of a set of known marker widths (e.g., 0.5", 1", 2", 3").

In one implementation, the system extracts a length and width of the hole (e.g., the area exhibiting low density data or an absence of data). The system can detect the hole as a marker in response to: the ratio of the width to the length exceeding a nominal tape ratio (e.g., 1:5); the variance of widths along the edges of the hole defining a variance less than a nominal variance (e.g., +/−5%); and the location of the area including the hole corresponding to a location of a marker detected within an image of the workpiece captured by the low resolution image sensor.

7.3 Marker Edge Smoothing

In one implementation, the marker can exhibit a non-constant geometry. For example, during marking of the workpiece via tape, an operator may apply the tape in a twisted or folded configuration resulting in non-linear or otherwise abnormal (e.g., jagged, discontinuous) boundaries of the tape. Therefore, the system can interpolate a smooth boundary corresponding to the boundary of the marker.

For example, during edge detection of the marker, the system can fit a function (e.g., a line or a curve) to the boundary of the tape at a location where the scan data defines a lowest density.

In one implementation, the system can: identify a degree of abnormality of the marker boundary (e.g., a variance from the fitted function); in response to a high degree of abnormality (e.g., a marker boundary defining jagged edges), generate a toolpath including actuating the sanding head a first offset distance (e.g., 5 mm) from the marker boundary; and, in response to a low degree of abnormality (e.g., a smooth or well-fitted marker boundary), generate a toolpath including actuating the sanding head a second offset distance less than the first offset distance (e.g., 1 mm) from the marker boundary. Therefore, the system navigates the sanding head proximal the boundary of the marker based on an initial condition of the marker to generate a smooth boundary of the processed region.

7.4 Marker Symbols

In one implementation, as shown in FIG. 2, the workpiece marker of the workpiece can define a symbol indicating a region to process or avoid processing.

7.4.1 Keep-Out Region

For example, as shown in FIG. 2, a region can include a marker boundary and an "X" symbol within the boundary. In this example, the "X" denotes a keep-out region indicating a region of the workpiece to avoid processing. Other examples of symbols denoting a keep-out region can include: markers that do not form a continuous enclosed area; markers defining a geometry approximating a forward slash ("/") or a black slash (" "). However, the system can be programmed to detect any other symbol or shape of marker as a keep-out zone indication.

7.4.2 Multiple Markers

In one implementation, the system can process a region of the workpiece based on the position of multiple markers. For example, the system can detect a first marker including: a first side; a second side opposite the first side; and a first geometry. The system can further detect a second marker: arranged proximal the first side of the first marker; and defining a second geometry different from the first geometry (e.g., defining an "X" symbol). The system, therefore, defines the region for processing as the region bounded by the second side of the marker based on the second marker arranged proximal the first side of the marker. As shown in FIG. 2, the second marker (e.g., the "X" marker) is arranged within the boundary of the first marker such that the second marker is proximal the first side of the first marker. Therefore, the system generates a toolpath to process the region proximal the second side of the marker (e.g., outside of the first marker).

Conversely, for a workpiece including a second marker outside of a region bounded by the first marker, the system can generate a toolpath to process only the region within a boundary defined by the first marker.

Additionally, a marker can define any geometry, color, pattern, or other feature and, based on the feature of the marker, the system can identify a region to process.

7.5 Workpiece Edge Detection

In one implementation, the system is configured to: detect edges of the workpiece; and detect target regions based on the locations of the workpiece edge and the maker.

For example, the system can: detect a first absence of data within the virtual model; detect the first absence of data as a marker by matching the geometry of the absence of data to a known marker geometry width (e.g., 0.25", 1", or 1.5"); detect a non-contiguous boundary of the marker partially bounding a region of the workpiece; detect a second absence of data within the virtual model; define the second absence of data as a workpiece edge by detecting a geometry of the second absence of data defining a width greater than the known marker geometry width; and define the workpiece edge as the boundary of the region to complete the non-contiguous boundary of the region corresponding to the marker.

In one implementation, the system can detect a corner of the workpiece as the target region based on detecting multiple edges of the workpiece and a single marker proximal multiple edges of the workpiece segmenting the workpiece into the corner region and the non-corner region. Similarly, the system can detect a region of the workpiece including an edge of the workpiece as the target region based on detecting an edge of the workpiece and multiple markers framing the edge of the workpiece. Additionally, the system can detect a region inset from the edges of the workpiece based on a marker or a set of markers defining a contiguous or nearly contiguous boundary around a region.

8. Processing Multiple Regions

In one implementation, the system can process multiple regions of the workpiece based on the marker. For example, for a workpiece including a sharp convex edge and a region on each side of a convex edge, the system can detect a marker along the convex edge and separately process the regions on either side of the marker. Therefore, the system avoids sanding over the convex edge while achieving a consistent finish on each side of the edge up to the edge.

In one implementation, the system can detect the marker on the workpiece based on the image by: detecting a first side of the marker; and detecting a second side of the marker, opposite the first side. Then, the system can define the first workpiece region bounded by the first side of the marker. During the processing cycle, the system navigates the sanding head across the first workpiece region according to the first toolpath by: navigating the sanding head according to the first target force to generate a first surface finish of the first workpiece region.

The system can additionally: define a second workpiece region bounded by the second side of the marker; define a second toolpath within the second workpiece region; assign a second target force different from the first target force to the second tool path; and, during a second processing cycle, navigate the sanding head according to the second toolpath and the second target force to generate a second surface finish of the second workpiece region different from the first surface finish of the first workpiece region.

Therefore, the system can execute Blocks of the method S100 to: define two separate regions on opposite sides of the marker; define two toolpaths; and process each region according to the corresponding toolpath.

9. Process Example

Generally, the system can identify a region for selective processing and process the region by: accessing a virtual model defining a geometry of a workpiece; by a set of actuators, navigating an optical sensor about the workpiece; accessing an image of the workpiece; detecting a marker, on the workpiece, depicted in the image; defining a first workpiece region of the workpiece bounded by the marker; defining a toolpath within the first workpiece region based on a geometry of the first workpiece region represented in the virtual model; and assigning a first target force to the first toolpath. Then, during a processing cycle the system can: access a first sequence of force values output by a force sensor coupled to the sanding head; via the set of actuators, navigate the sanding head across the first workpiece region according to the first toolpath; and, based on the first sequence of force values, deviate the sanding head from the first toolpath to maintain forces of the sanding head on the workpiece proximal the first target force.

Figure 4:
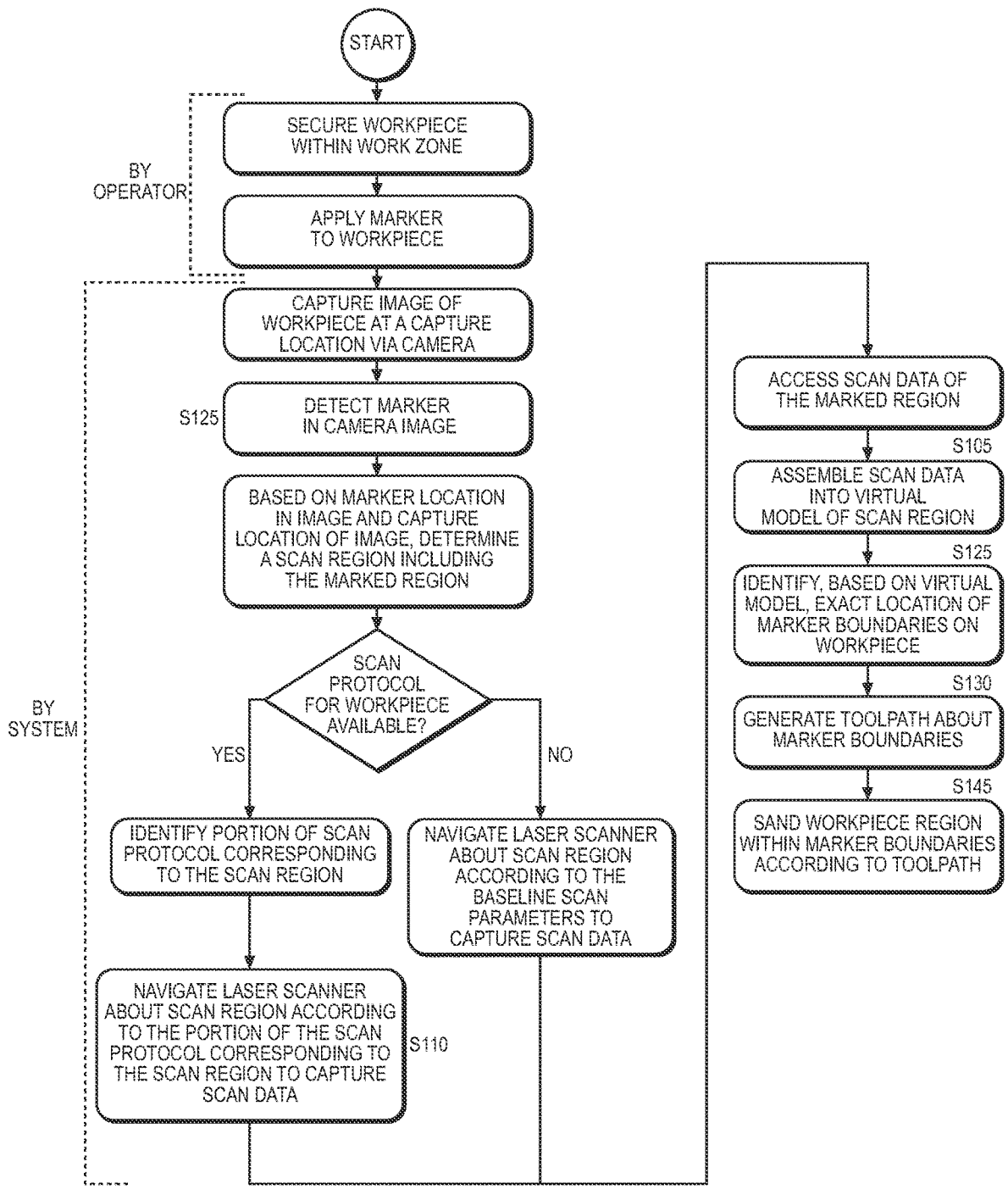
FIG. 4 is a flowchart representation of one variation of the method.

In particular, as shown in FIG. 4, the system can: navigate a camera to an image capture location; and trigger the camera, occupying the image capture location, to capture an image of the workpiece. The camera: captures a two-dimensional black-and-white or color image of the workpiece; and transmits the image to the computer system. The computer system (e.g., the system) can: access the image; extract features from the image including a pixel value (e.g., light intensity and/or color) for each pixel of the image; and, based on the pixel values, detect a marker on the workpiece. For example, the system can detect the marker by: accessing a database of marker features including marker colors and geometries; and identifying a set of pixels in the image matching a marker feature (e.g., identifying a grouping of blue colored pixels in the image approximating a target marker color and target marker geometry within the database of marker features). Therefore, the system can detect the marker on the workpiece based on the two-dimensional image of the workpiece.

The system can, based on the marker in the image, define an approximate location of the marker relative to the workpiece to generate a target region for the optical sensor to scan. In one implementation, the system can derive a location of the marker relative to edges of the workpiece. For example, the system can: access the capture location of the image; detect edges of the workpiece within the image; detect the marker within the image; derive a relative distance between the marker and the workpiece; and characterize the location of the marker based on distances between the marker and the workpiece (e.g., the marker is located in a lower right quadrant of the workpiece or the marker is located between ⅓ and ⅔ of the length of the workpiece and ¼ and W of the height of the workpiece). The system can then define the approximate location of the marker as a target region of the workpiece. In one implementation, the system adds a buffer distance (e.g., 1-10 inches past each edge of the maker) around the approximate location of the marker to ensure that the marker is within the target region. Therefore, based on the image, the system can define a region of the workpiece as the target region.

The system can continue the scanning process by navigating the optical sensor (e.g., a laser scanner) about the target region to capture scan data. Via the set of actuators, the system can traverse the optical sensor about the target region to generate scan data defining a surface contour of the marked region. In one implementation, the system can traverse the optical sensor about the target region according to a previously derived scan protocol. For example, if a scan protocol is available for the workpiece, the system can identify a region of the scan protocol corresponding to the target region; and navigate the optical sensor about the target region according to the region scan protocol. However, if no scan protocol is available, the system can navigate the optical sensor about the target region according to a different set of scan parameters.

The system can: assemble the scan data of the target region (including a surface contour of the marked region) into a three-dimensional virtual model of the marked region of the workpiece; and, based on the virtual model, identify an accurate location of marker edges (e.g., boundaries) via edge detection as described above. The system can then generate a toolpath to selectively process the marked region.

In the foregoing implementation, the system can decrease the surface area scanned by the optical sensor by restricting the navigation of the optical sensor to within the target region. Therefore, by decreasing the area of the workpiece "scanned" by the optical sensor, the system can decrease the computational complexity of the method S100 and decrease a latency of the process while defining a high-accuracy location of the marker and processing the workpiece within according to that high-accuracy location.

9.1 Process Variation: No Optical Sensor, Camera Only

As described above, the system can: detect the marker based on an image of the workpiece; and derive an approximate location of the marker relative to the features (boundaries, edges) of the workpiece. In one implementation, the system can then: access an existing virtual model (e.g., a computer-aided-design model, baseline model, etc.) of the workpiece; project the marker onto the virtual model; and derive a location of the marked region based on the projection of the marker onto the virtual model.

For example, the system can: access a virtual model (e.g., computer-aided-design model or baseline model) defining a three-dimensional representation of the geometry of the workpiece; navigate a color camera about the workpiece to capture an image of the workpiece; access the image captured by the color camera; access a target marker color and a target marker geometry; detect a set of pixels within the image defining the target marker color and the target marker geometry within the image; project the marker onto the computer-aided-design model based on the image; derive a coordinate location bounded by the marker of a first virtual region corresponding to the first workpiece region of the computer-aided-design model; calculate boundaries of the workpiece region based on the coordinate location bounded by the marker of the first virtual region; define a set of toolpath coordinates within the boundaries of the workpiece region; and navigate the sanding head to the set of toolpath coordinates within the boundaries of the workpiece region.

9.2 Process Variation: No Camera, Optical Sensor Only

In another implementation, the system can detect the marker via the optical sensor. For example, a workpiece may be marked before a scan protocol cycle of the workpiece. Therefore, during execution of the scan protocol cycle, the optical sensor captures scan data including the marker (e.g., including holes corresponding to the marker) and the system can detect the marker without capturing an image of the workpiece.

For example the system can: navigate the optical sensor (e.g., a laser scanner) about the entire workpiece to capture a set of scan data representing a surface contour of the workpiece; access the set of scan data representing the surface contour of the workpiece; assemble the set of depth data into a virtual model representing the surface contour of the workpiece; access a target marker geometry; detect the marker in the virtual model approximating the target marker geometry; derive a coordinate location bounded by the marker of a first virtual region; calculate boundaries of the workpiece region based on the coordinate location bounded by the marker of the first virtual region; define a set of toolpath coordinates within the boundaries of the workpiece region; and, during a processing cycle, navigate the sanding head to the set of toolpath coordinates within the boundaries of the workpiece region.

10. Tool Path Generation

The system can further implement methods and techniques described in U.S. patent application Ser. No. 18/111,470 to define a toolpath within each region of the workpiece.

In one implementation, the system can set a first feed rate for the first region proportional to the target force assigned to the first region. The system can also set a first stepover distance between segments of a first toolpath for a first region of the workpiece: based on (e.g., proportional to) the target force assigned to this region of the workpiece; and/or proportional to a minimum radius within the first region of the workpiece. The system can then: define a serpentine or boustrophedonic toolpath within the first region of the workpiece according to the nominal stepover distance; and store this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region of the workpiece represented in the virtual model. The system can then extract a three-dimensional position and normal vector of each vertex or other point on the first toolpath from the virtual model. Accordingly, the system can store the first toolpath as a first ordered sequence of keypoints: located on a first unloaded surface of the workpiece stored in (i.e., represented by) the virtual model; and contained within the first workpiece region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion of the workpiece and a target force less than the nominal target force within a convex subregion of the workpiece. The system can repeat this process for each other region of the workpiece.

Alternatively, the system can implement the foregoing methods and techniques to generate a single continuous toolpath spanning the entire workpiece (or an entire surface of the workpiece selected for autonomous processing by the system).

In one implementation, the system can generate the first toolpath by: defining the first toolpath including a first ordered sequence of keypoints located on the third virtual model; and, for each keypoint in the first ordered sequence of keypoints, calculating a vector normal to the third virtual model at a location of the keypoint on the third virtual model and storing the vector in the keypoint. The system navigates the sanding head across the first workpiece region according to the first toolpath and deviates the sanding head from the first toolpath by: for a first keypoint in the first ordered sequence of keypoints, via the set of actuators, locating the sanding head at a first position intersecting the first keypoint and aligning an axis of the sanding head to a first vector contained in the first keypoint; and driving the sanding head, coaxial with the first vector, toward the workpiece to match force values, in the first sequence of force values read from the force sensor to the nominal target force.

In another implementation, the system can generate the toolpath by: identifying the first workpiece region, defining a convex surface profile, in the geometry of the workpiece; and generating the first toolpath defining a first continuous path across the first workpiece region of the workpiece. Then, during the processing cycle, the system can detect a first sequence of positions of the sanding head traversing the first workpiece region by detecting the first sequence of positions of a reference point while the sanding head traverses the first workpiece region, the reference point located on a sanding pad mounted to the sanding head and coaxial an axis of rotation of the sanding head.

10.1 Toolpath Modifications Based on Marker Generally, the system can define and modify the toolpath based on the marker on the workpiece to generate an accurate surface finish along an edge of the marker.

Figure 3A:
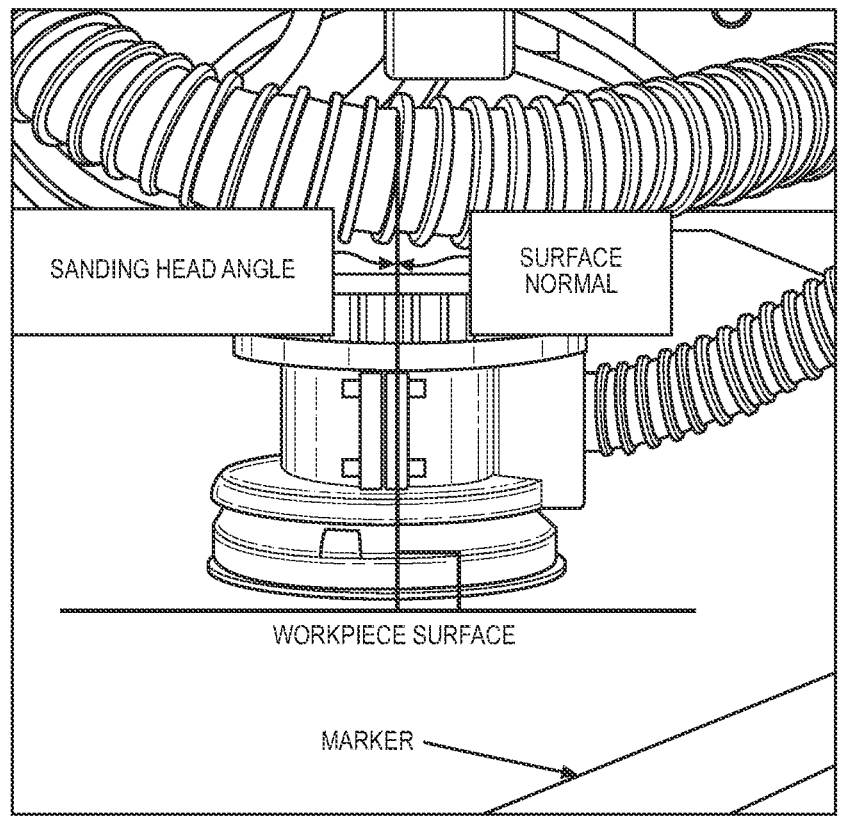
FIG. 3A is a representation of one variation of the method.
Figure 3B:
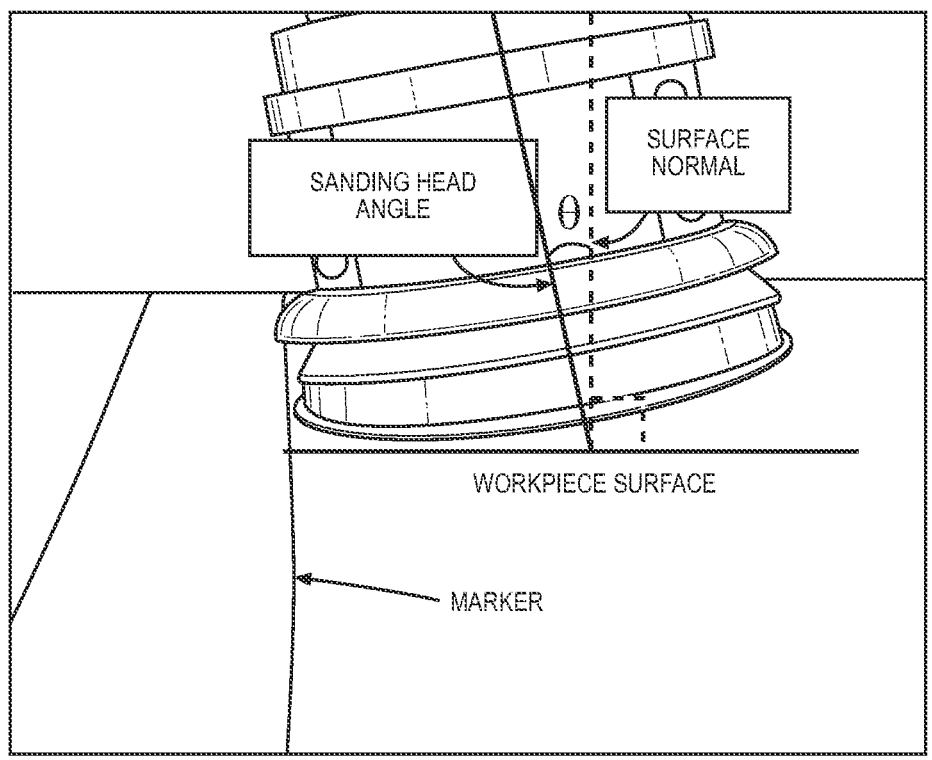
FIG. 3B is a representation of one variation of the method.

In another implementation, the system can define the toolpath to generate a blended edge (e.g., an edge along the marker boundary exhibiting a finish blended with the workpiece beyond the marker boundary). For example, the system is configured to define an edge toolpath along a boundary of the marker, the edge toolpath including: maintaining the sanding disc of the sanding head normal to a surface of the workpiece outside of a threshold radius of the boundary of the marker; and deflecting the sanding head to a non-normal orientation within the threshold radius (e.g., 2 mm) of the boundary of the marker to generate a blended edge finish along the boundary of the marker, as shown in FIG. 3B.

10.2 Hard Sanding Edge

In one variation, the system can: receive a selection of a "hard" edge finish (e.g., an edge that is not blended with the workpiece outside of the target region); and define a toolpath to generate a "hard" edge.

In this variation, the system can: divide the target region of the workpiece into an inner target region inset from the boundary of the marker and an outer target region interposed between the inner target region and the boundary (e.g., proximal the boundary); generate a first toolpath instruction to set an axis of the sanding head normal to the surface of the workpiece within the inner target region; and generate a second toolpath instruction to deviate the axis of the sanding head from normal (e.g., tilt the sanding head) within the outer target region. For example, within the outer target region, the system can: traverse the edge of the sanding pad along and slightly inset from (e.g., by one millimeter) the boundary of the target region; and prioritize material removal along the boundary of the target region. In one example, the system can: generate a toolpath instruction to tilt the sanding head 5° from normal toward the marker and execute the processing cycle according to the toolpath instruction.

10.3 Smooth Sanding Transition

In one variation, the system can: receive selection of a "smooth" edge finish (e.g., an edge of the target region that is blended with the workpiece outside of the target region); and define a toolpath to generate the "smooth" edge.

In this variation, the system can: divide the target region of the workpiece into an inner target region inset from the boundary of the marker and an outer target region interposed between the inner target region and the boundary (e.g., proximal the boundary); assign a nominal target force of the handing head against the workpiece to the inner target region; and assign a variable target force to the outer target region. For example, the variable target force can include a force that reduces from the nominal force to a null force as the sanding head approaches the target region boundary (e.g., the marker).

11. Processing Cycle

In one implementation, the method S100 includes accessing a first sequence of force values output by a force sensor coupled to a sanding head arranged on the end effector during a processing cycle. Via the set of actuators coupled to the end effector, the system can: navigate the sanding head across the first workpiece region according to the first toolpath; and, based on a first sequence of force values, deviate the sanding head from the first toolpath to maintain forces of the sanding head on the first workpiece region proximal the first target force.

Generally, the system can implement methods and techniques described in U.S. patent application Ser. No. 18/111, 470 to autonomously navigate the sanding head along a toolpath (e.g., a sequence of keypoints) defined within a region of the workpiece and to maintain a target normal force between the sanding head and the workpiece by selectively moving the sanding head toward and away from the workpiece normal to the surface of the workpiece represented in the virtual model.

The system can also implement closed-loop controls to maintain a target force between the sanding head and the workpiece within each workpiece region—based on force values read from the force sensor integrated into the sanding head—by driving the sanding head toward and away from the workpiece along vectors normal to the workpiece, such as represented in keypoints of these toolpaths or extracted from the virtual model during the processing cycle. For example, for a first keypoint in the first ordered sequence of keypoints, the system can drive the set of actuators to: locate the sanding head at a first three-dimensional position intersecting the first keypoint; align an axis of the sanding head to a first vector contained in the first keypoint; and drive the sanding head, coaxial with the first vector, toward the workpiece to match force values, in a sequence of force values read from the force sensor in the sanding head, to a first target force assigned to a first toolpath containing the first keypoint. The system can then drive the set of actuators to interpolate a three-dimensional path and sanding head orientation from the first keypoint to the second keypoint while implementing closed-loop controls to apply the sanding head to the workpiece with the first target force. The system can repeat this process for each other keypoint defined along the first toolpath and then along subsequent toolpaths defined for other regions of the workpiece.

In another implementation, the system can define a first ordered sequence of keypoints located on the virtual model. For each keypoint in the first ordered sequence of keypoints, the system can: calculate a vector normal to the virtual model at a location of the keypoint on the virtual model; and store the vector in the keypoint. The system can then store the first ordered sequence of keypoints as the first toolpath. Then, for a first keypoint in the first ordered sequence of keypoints, the system can: locate the sanding head at a first position intersecting the first keypoint; align an axis of the sanding head to a first vector contained in the first keypoint; and drive the sanding head, coaxial the first vector, toward the workpiece to match force values, in the first sequence of force values read from the force sensor, to the first target force.

In one implementation, during the processing cycle, the system can: access a first sequence of force values output by a force sensor coupled to a sanding head arranged on an end effector; via a set of actuators coupled to the end effector, navigate the sanding head across the first workpiece region according to the first toolpath; based on the first sequence of force values, deviate the sanding head from the first toolpath to maintain forces of the sanding head on the first workpiece region proximal the first target force; and detect a first sequence of positions of the sanding head traversing the first workpiece region. The system can then: interpret a first surface contour in the first workpiece region based on the first sequence of positions; access a first dimensional tolerance assigned to the first target surface defined in the target model; detect a first difference between the first surface contour and a first target surface, corresponding to the first surface contour, defined in the target model; and, in response to the first difference exceeding the first dimensional tolerance, generate a second toolpath for the first workpiece region. During a second processing cycle, via the set of actuators, the system can navigate the sanding head across the first workpiece region according to the second toolpath.

In one implementation, navigating the sanding head across the first workpiece region includes navigating the sanding head across the first workpiece region via the set of actuators including the robotic arm supporting the end effector and a sanding head, the sanding head including an orbital sander. The system can access the first sequence of force values by accessing the first sequence of force values output by the force sensor arranged between the end effector and the sanding head.

11.1 Decrease Force

In one implementation, the system is configured to decrease a force between the toolhead (e.g., the sanding head) and the workpiece when the toolhead is proximal the marker.

In this implementation, the system can define a toolpath within the marked region by: generating a first toolpath segment proximal a center of the first workpiece region; and generating a second toolpath segment proximal a boundary of the marker. The system can then: assign a first target force to the first toolpath segment; and assign a second target force less than the first target force to the second toolpath segment. During the process cycle, the system can: navigate the sanding head along the first toolpath segment within a center of the first workpiece region; deviate the sanding head from the first toolpath segment to maintain forces of the sanding head on the workpiece proximal the first target force; navigate the sanding head along the second toolpath segment along the boundary of the marker; and deviate the sanding head from the second toolpath segment to maintain forces of the sanding head on the workpiece proximal the second target force.

Therefore, the system is configured to reduce force on the toolhead proximal the marker to create a blended surface finish proximal the marker.

11.2 Wear Modeling

In one implementation, the system is additionally configured to generate a wear model indicating an abrasive degradation of the sanding head. Generally, the system can modify processing parameters for the workpiece—such as target force, feed rate, toolpath stepover distance, and/or sanding head orientation relative to the workpiece—in real-time during the processing cycle based on abrasive degradation across the sanding pad according to the method described in U.S. patent application Ser. No. 18/136,241.

12. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   accessing an image of the workpiece;
   detecting a marker, on the workpiece, depicted in the image;
   defining a first workpiece region of the workpiece bounded by the marker;
   defining a toolpath within the first workpiece region based on a geometry of the first workpiece region;
   assigning a first target force to the first toolpath; and during a processing cycle:
  accessing a first sequence of force values output by a force sensor coupled to the sanding head; and
  via a set of actuators:
    navigating the sanding head across the first workpiece region according to the first toolpath; and
    based on the first sequence of force values, deviating the sanding head from the first toolpath to maintain forces of the sanding head on the workpiece proximal the first target force.

2. The method of claim 1:
further comprising:
  accessing a computer-aided-design model defining a three-dimensional representation of the geometry of the workpiece;
wherein accessing the image of the workpiece comprises:
  accessing the image captured by a color camera;
wherein detecting the marker, on the workpiece, depicted in the image comprises:
  accessing a target marker color; and
  detecting a set of pixels within the image defining the target marker color;
wherein defining the first workpiece region of the workpiece bounded by the marker comprises:
  projecting the marker onto the computer-aided-design model based on the image; and
  deriving a coordinate location bounded by the marker of a first virtual region corresponding to the first workpiece region of the computer-aided-design model;
wherein defining the toolpath within the first workpiece region comprises:
  calculating boundaries of the workpiece region based on the coordinate location bounded by the marker of the first virtual region; and
  defining a set of toolpath coordinates within the boundaries of the workpiece region; and
wherein, during the processing cycle, navigating the sanding head across the first workpiece region comprises:
  navigating the sanding head to the set of toolpath coordinates within the boundaries of the workpiece region.

3. The method of claim 1:
wherein detecting the marker, on the workpiece, depicted in the image comprises:
  detecting a first side of the marker; and
  detecting a second side of the marker, opposite the first side;
wherein defining the first workpiece region of the workpiece bounded by the marker comprises:
  defining the first workpiece region bounded by the first side of the marker;
wherein, during the processing cycle, navigating the sanding head across the first workpiece region according to the first toolpath comprises:
  navigating the sanding head according to the first target force to generate a first surface finish of the first workpiece region; and
further comprising:
  defining a second workpiece region bounded by the second side of the marker;
  defining a second toolpath within the second workpiece region;
  assigning a second target force different from the first target force to second tool path; and during a second processing cycle:
  navigating the sanding head according to the second toolpath and the second target force to generate a second surface finish of the second workpiece region different from the first surface finish of the first workpiece region.

4. The method of claim 1:
further comprising:
  by the set of actuators, navigating an optical sensor about the workpiece to generate a set of scan data; and
  assembling a virtual model defining a geometry of a workpiece, based on the set of scan data; and
wherein defining the toolpath within the first workpiece region based on the geometry of the first workpiece region comprises:
  defining the toolpath within the first workpiece region based on the geometry of the first workpiece represented in the virtual model.

5. The method of claim 4:
further comprising:
  accessing a first set of processing parameters assigned to the first workpiece region, the first set of processing parameters comprising a first target force and a first feed rate;
  accessing a wear model representing abrasive degradation of a sanding pad arranged on a sanding head;
  during the processing cycle:
    accessing a first sequence of contact characteristics representing contact between a first abrasive area on the sanding pad and the workpiece;
    estimating a first abrasive degradation of the first abrasive area based on the wear model and the first sequence of contact characteristics; and
    modifying the first set of processing parameters based on the first abrasive degradation.

6. A method comprising:
accessing a virtual model defining a geometry of a workpiece;
by a set of actuators, navigating an optical sensor about the workpiece;
accessing an image of the workpiece;
detecting a marker, on the workpiece, depicted in the image;
defining a first workpiece region of the workpiece bounded by the marker;
defining a toolpath within the first workpiece region based on a geometry of the first workpiece region represented in the virtual model;
assigning a first target force to the first toolpath; and
during a processing cycle:
  accessing a first sequence of force values output by a force sensor coupled to the sanding head; and
  via the set of actuators:
    navigating the sanding head across the first workpiece region according to the first toolpath; and
    based on the first sequence of force values, deviating the sanding head from the first toolpath to maintain forces of the sanding head on the workpiece proximal the first target force.

7. The method of claim 6:
wherein accessing the virtual model comprises:
  accessing a computer-aided-design model defining a three-dimensional representation of the geometry of the workpiece;
wherein navigating the optical sensor about the workpiece comprises:

navigating a color camera about the workpiece to capture an image of the workpiece;
wherein accessing the image of the workpiece comprises: accessing the image captured by the color camera;
wherein detecting the marker, on the workpiece, depicted in the image comprises:
accessing:
a target marker color; and
a target marker geometry; and
detecting a set of pixels within the image defining the target marker color and the target marker geometry within the image;
wherein defining the first workpiece region of the workpiece bounded by the marker comprises:
projecting the marker onto the computer-aided-design model based on the image; and
deriving a coordinate location bounded by the marker of a first virtual region corresponding to the first workpiece region of the computer-aided-design model;
wherein defining the toolpath within the first workpiece region comprises:
calculating boundaries of the workpiece region based on the coordinate location bounded by the marker of the first virtual region; and
defining a set of toolpath coordinates within the boundaries of the workpiece region; and
wherein, during the process cycle, navigating the sanding head across the first workpiece region comprises:
navigating the sanding head to the set of toolpath coordinates within the boundaries of the workpiece region.

8. The method of claim 6:
wherein navigating the optical sensor about the workpiece comprises:
navigating a laser scanner about the workpiece to capture a set of scan data representing a surface contour of the workpiece;
wherein accessing the image of the workpiece comprises:
accessing the set of scan data representing the surface contour of the workpiece;
wherein accessing the virtual model comprises:
assembling the set of scan data into a virtual model representing the surface contour of the workpiece;
wherein detecting the marker, on the workpiece, depicted in the image comprises:
accessing a target marker geometry; and
detecting the marker in the virtual model approximating the target marker geometry;
wherein defining the first workpiece region of the workpiece bounded by the marker comprises:
deriving a coordinate location bounded by the marker of a first virtual region;
wherein defining the toolpath within the first workpiece region comprises:
calculating boundaries of the workpiece region based on the coordinate location bounded by the marker of the first virtual region; and
defining a set of toolpath coordinates within the boundaries of the workpiece region; and
wherein, during the process cycle, navigating the sanding head across the first workpiece region comprises:
navigating the sanding head to the set of toolpath coordinates within the boundaries of the workpiece region.

9. The method of claim 6:
wherein detecting the marker comprises:
detecting an absence of data within the virtual model;
deriving a geometry of the absence of data within the virtual model;
accessing a set of marker geometry templates; and
matching the geometry of the absence of data to a marker geometry template of the set of marker geometry templates; and
wherein defining the toolpath within the first workpiece region comprises:
defining the toolpath based on the marker geometry template of the set of marker geometry templates.

10. The method of claim 6:
wherein detecting the marker comprises:
detecting an absence of data within the virtual model;
deriving:
a length parameter of the absence of data within the virtual model; and
a width parameter of the absence of data within the virtual model;
accessing a set of parameter dimensions;
identifying a first parameter dimension of the set of parameter dimensions approximating the length parameter; and
identifying a second parameter dimension of the set of parameter dimensions approximating the width parameter; and
wherein defining the toolpath within the first workpiece region comprises:
defining the toolpath based on the first parameter dimension and the second parameter dimension of the set of parameter dimensions.

11. The method of claim 6:
wherein accessing the image of the workpiece comprises:
accessing a color image of the workpiece captured by a color camera;
wherein detecting the marker, on the workpiece, depicted in the image, comprises:
detecting the marker on the workpiece within the color image;
wherein defining the first workpiece region of the workpiece bounded by the marker comprises:
defining a location the first workpiece region within the workpiece based on a location of the marker within the color image;
wherein navigating the optical sensor about the workpiece comprises:
navigating a laser scanner about the first workpiece region to generate a set of scan data defining a surface contour of the first workpiece region; and
wherein accessing the virtual model comprises:
assembling the set of scan data into a virtual model representing the first workpiece region.

12. The method of claim 6:
wherein defining the toolpath within the first workpiece region comprises:
defining an edge toolpath along a boundary of the marker, the edge toolpath comprising:
maintaining a sanding disc of the sanding head normal to a surface of the workpiece up to the boundary of the marker to generate a hard edge finish along the boundary of the marker.

13. The method of claim 6:
wherein defining the toolpath within the first workpiece region comprises:
defining an edge toolpath along a boundary of the marker, the edge toolpath comprising:

maintaining a sanding disc of the sanding head normal to a surface of the workpiece outside of a threshold radius of the boundary of the marker; and deflecting the sanding head to a non-normal orientation within the threshold radius of the boundary of the marker to generate a blended edge finish along the boundary of the marker.

14. The method of claim 6:

wherein defining the toolpath within the first workpiece region comprises:
  generating a first toolpath segment proximal a center of the first workpiece region; and
  generating a second toolpath segment proximal a boundary of the marker;

wherein assigning the first target force to the first toolpath comprises:
  assigning a first target force to the first toolpath segment; and o assigning a second target force less than the first target force to the second toolpath segment; and wherein, during the processing cycle, navigating the sanding head across the first workpiece region according to the first toolpath comprises:
  navigating the sanding head along the first toolpath segment within a center of the first workpiece region;
  deviating the sanding head from the first toolpath segment to maintain forces of the sanding head on the workpiece proximal the first target force;
  navigating the sanding head along the second toolpath segment proximal the boundary of the marker; and
  deviating the sanding head from the second toolpath segment to maintain forces of the sanding head on the workpiece proximal the second target force.

15. The method of claim 6:

wherein defining the toolpath comprises:
  defining the toolpath comprising a first ordered sequence of keypoints located on the virtual model; and
  for each keypoint in the first ordered sequence of keypoints:
    calculating a vector normal to the virtual model at a location of the keypoint on the virtual model; and
    storing the vector in the keypoint; and wherein navigating the sanding head across the first workpiece region comprises:
  for a first keypoint in the first ordered sequence of keypoints, via the set of actuators:
    locating the sanding head at a first position intersecting the first keypoint; and
    aligning an axis of the sanding head to a first vector contained in the first keypoint; and
    driving the sanding head, coaxial the first vector, toward the workpiece to match force values, in the first sequence of force values read from the force sensor to the nominal target force.

16. The method of claim 6:

further comprising:
  accessing a first set of processing parameters assigned to the first workpiece region, the first set of processing parameters comprising a first target force and a first feed rate;
  accessing a wear model representing abrasive degradation of a sanding pad arranged on a sanding head;

during the processing cycle:
  accessing a first sequence of contact characteristics representing contact between a first abrasive area on the sanding pad and the workpiece;
  estimating a first abrasive degradation of the first abrasive area based on the wear model and the first sequence of contact characteristics; and
  modifying the first set of processing parameters based on the first abrasive degradation.

17. The method of claim 6:

wherein detecting the marker on the workpiece comprises:
  detecting the marker comprising:
    a first side of the marker;
    a second side of the marker, opposite the first side; and
    a first geometry; and
  detecting a second marker:
    arranged proximal the second side of the marker; and
    defining a second geometry different from the first geometry; and wherein defining the first workpiece region of the workpiece bounded by the marker comprises:
  defining the first workpiece region bounded by the first side of the marker based on second marker arranged proximal the second side of the marker.

18. The method of claim 6:

wherein detecting the marker, on the workpiece, depicted in the image comprises:
  detecting a marker dividing the workpiece into:
    a first segment arranged on a first side of the marker; and
    a second segment arranged on a second side of the marker opposite the first side of the marker; and wherein defining the first workpiece region of the workpiece bounded by the marker comprises:
  defining the first workpiece region as the first segment arranged on the first side of the marker.

19. The method of claim 6:

wherein detecting the marker, on the workpiece, depicted in the image comprises:
  detecting a marker segmenting the workpiece into:
    a first segment arranged on a first side of the marker; and
    a second segment arranged on a second side of the marker opposite the first side of the marker; and wherein defining the first workpiece region of the workpiece bounded by the marker comprises:
  defining the first workpiece region as the second segment arranged on the second side of the marker.

20. The method of claim 6:

wherein detecting the marker, on the workpiece, depicted in the image comprises:
  detecting a first side of the marker; and
  detecting a second side of the marker, opposite the first side;

wherein defining the first workpiece region of the workpiece bounded by the marker comprises:
  defining the first workpiece region bounded by the first side of the marker;

wherein, during the processing cycle, navigating the sanding head across the first workpiece region according to the first toolpath comprises:
  navigating the sanding head according to the first target force to generate a first surface finish of the first workpiece region; and further comprising:
defining a second workpiece region bounded by the second side of the marker;
defining a second toolpath within the second workpiece region;
assigning a second target force different from the first target force to the second toolpath; and
during a second processing cycle:
navigating the sanding head according to the second toolpath and the second target force to generate a second surface finish of the second workpiece region different from the first surface finish of the first workpiece region.

\* \* \* \* \*